July 3, 1928. 1,675,982
J. LYALL
CONTROL OR CHANGE OVER VALVE MECHANISM
Filed April 26, 1926  7 Sheets-Sheet 1

J. LYALL

1,675,982

CONTROL OR CHANGE OVER VALVE MECHANISM

Filed April 26, 1926   7 Sheets-Sheet 5

July 3, 1928. 1,675,982
J. LYALL
CONTROL OR CHANGE OVER VALVE MECHANISM
Filed April 26, 1926   7 Sheets-Sheet 7

Patented July 3, 1928.

1,675,982

UNITED STATES PATENT OFFICE.

JOHN LYALL, OF LEITH, SCOTLAND.

CONTROL OR CHANGE-OVER VALVE MECHANISM.

Application filed April 26, 1926, Serial No. 104,752, and in Great Britain April 28, 1925.

In fluid systems and apparatus, it is sometimes necessary to provide two or more pairs of valves for controlling the supply of the fluid or fluids, and it is then frequently necessary that each pair of valves should be designed to be rapidly opened and closed, so that a change of direction of the fluid or the supply of a different fluid may be effected.

Thus, for example, in the case of a pair of steam steering or other engines each having a valve chest, by interposing my improved valve mechanism between the two valve chests and operating the valve mechanism from the usual hunting gear of the steering engines, it is possible to prevent the great waste of steam occasioned by the blow-through of steam through the valve or valves at present commonly fitted to such steering engines, so that I am enabled to obtain greater economy and efficiency.

Furthermore, an alternate heating and cooling apparatus, it is necessary to change-over from a hot fluid to a cooling fluid and vice-versa and, in order that the heating phase may be accomplished in the shortest possible time, it is essential that the cooling fluid should be effectively and rapidly swept out of the system or apparatus between the cooling and heating phases. Such a requirement exists, for example, in the case of platen moulding presses for alternately heating and cooling a plastic mass during the moulding operation, when the platen must be alternately heated with steam and cooled with water.

My invention accordingly comprises valve gear or mechanism designed to actuate a plurality of valves, one or more of which require to be opened, whilst the remaining valve or valves remain closed, and vice-versa.

Although my invention is hereinafter more particularly described with reference to steering engines and to the alternate heating and cooling of the platen of a moulding press, it is to be understood that my invention is not limited in its application to such apparatus, but is equally applicable to the control of any other pressure fluid supply to engines or machinery or for changing over from one fluid supply to another.

In order that my invention may be more clearly understood, reference will be hereinafter made to the accompanying drawings, whereon:—

Fig. 10 is a sectional view of one of the valve gears for the platen press, in the dwell position of the operating lever.

Referring firstly to Figs. 1 to 6 of the accompanying drawings, which illustrate my invention employed as a control valve gear for a steam steering engine, a steam chest (Figs. 1 and 2) comprises parallel longitudinal inlet and exhaust passages 30 and 31 respectively which cross transverse steam connections 32 and 33 which communicate with the valve chests of the two steering engines in the usual manner, that is to say, one of the steam connections opens to the centres of the valve chests and the other to the ends thereof, so that steam may exhaust from the steering engines either from the centres of the valves chests or over the ends of the valves therein, according to the direction in which the steering engines are running.

Figure 7:
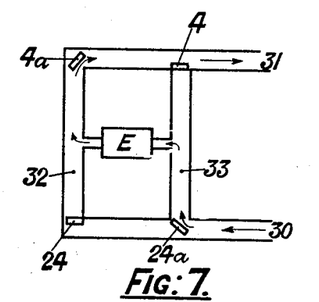
Figure 8:
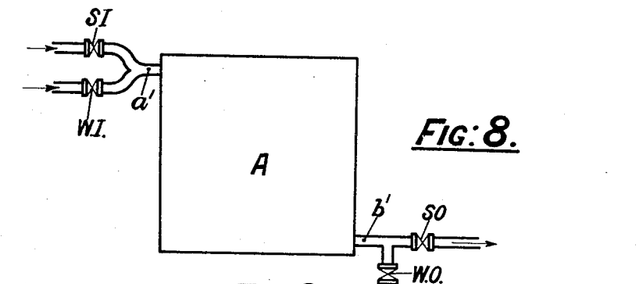
Fig. 8 is a diagram representing the application of my invention to a fluid system or apparatus, such as the platen of a moulding press.

The steam inlet passage 30 has valve ports 36 and 37 communicating with the steam connections 32 and 33 respectively and the steam exhaust passage 31 has similar valve ports 34 and 35, communicating with the steam connections 32 and 33 respectively. The ports 34, 35, 36 and 37 are controlled by valves 4, $4^a$, 24 and $24^a$ respectively, which are actuated in such manner that valves 4 and 24 open and close together, whilst valves $4^a$ and $24^a$ can be opened and closed together, but valves $4^a$ and $24^a$ remain closed so long as valves 4 and 24 are open, and vice-versa. This will be readily apparent from the diagrammatic sketches, Figs. 6 and 7, in which E diagrammatically represents the valve chests of the steam steering engines.

It follows from the foregoing description that steam can be admitted through valve 24 to steam connection 32 or through valve $24^a$ to steam connection 33, and that, if steam is supplied to steam connection 32 through valve 24, then the steam will exhaust through steam connection 33 and valve 4 into exhaust passage 31. Conversely, if steam is supplied to steam connection 33 through valve $24^a$, then the steam will exhaust through steam connection 32 and valve $4^a$ into exhaust passage 31.

The valves 24 and $24^a$ shown are of the balanced piston type, but any convenient type of valve may be employed and the mechanism for actuating the valves may be of any construction which will cause the valves to function in the manner already described.

The valve gear shown on the drawings is adapted to be operated from the usual hunting gear of a steering engine. It comprises valve rods 3, $3^a$, $3^b$ and $3^c$, each connected by connections 5, $5^a$, $5^b$, $5^c$ respectively to one of two pairs of levers 6, $6^a$, $6^b$ and $6^c$, each of which is pivoted at 7, $7^a$ upon a fixed bracket 8. The lever 6 has a single cam face 9 and the levers $6^a$, $6^b$ and $6^c$ have corresponding cam faces $9^a$, $9^b$ and $9^c$. The two cam faces 9 and $9^a$ and the two cam faces $9^b$ and $9^c$ are oppositely inclined to each other on each side of the vertical centre line C, L of the valve gear. The cam 9 cooperates with a roller 10 and the cams $9^a$, $9^b$ and $9^c$ cooperate with rollers $10^a$, $10^b$ and $10^c$ respectively. The rollers 10, $10^a$, $10^b$ and $10^c$ are carried on rods 11 each connected to a pair of rockers 12 mounted on a rocking shaft or center 13 and adapted to be actuated by an operating rod 14. The rockers 12 may be actuated either manually or mechanically according to requirements. The two rockers 12 are also connected by a rod 15 which carries a pair of rollers 16, $16^a$. The roller 16 cooperates with a pair of closing cam faces 17, $17^a$ on the closing cam levers 18 and $18^a$ respectively. The closing cam levers 18 and $18^a$ are pivoted at 19 and $19^a$ on the bracket 8. The roller $16^a$ cooperates with a pair of closing cam faces $17^b$ and $17^c$ on closing cam levers $18^b$ and $18^c$ respectively. Lever $18^b$ is pivoted on rod $19^a$ and lever $18^c$ on rod 19.

Figure 1:
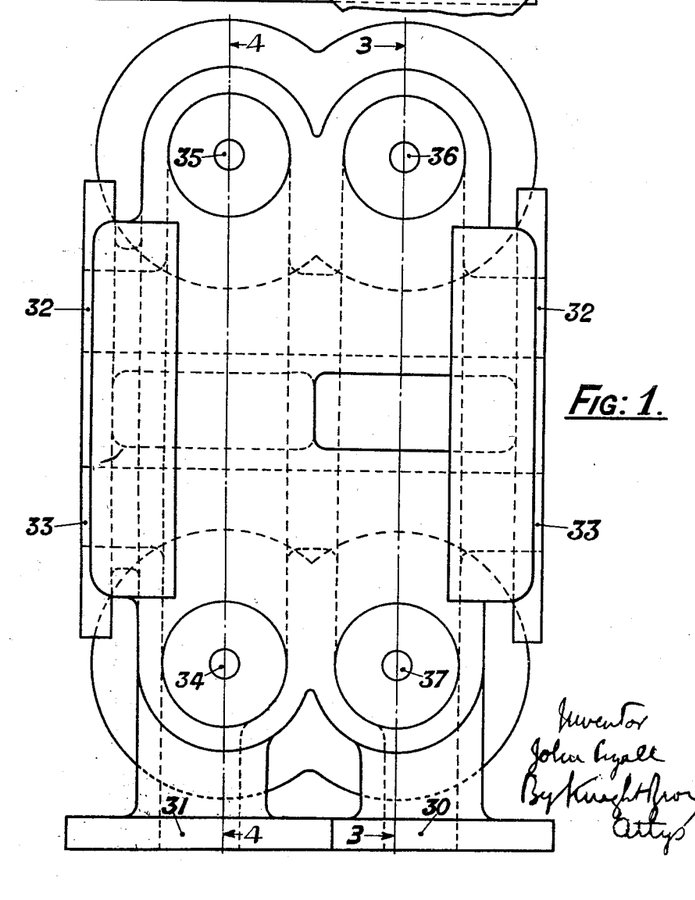
Fig. 1 is a plan view and Fig. 2 an end view (partly broken away) of a steam chest for a steam steering engine constructed according to my invention, but with the valves and valve gear removed.
Figure 2:
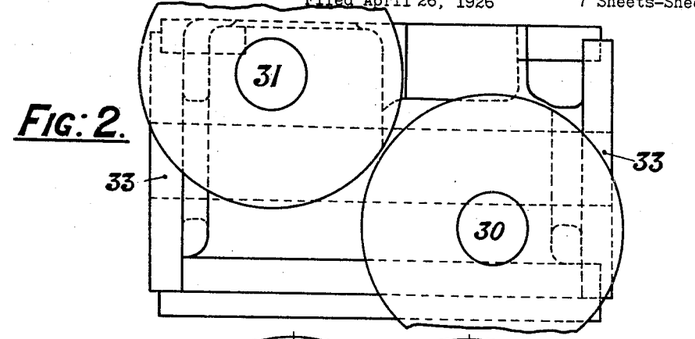
Figure 3:
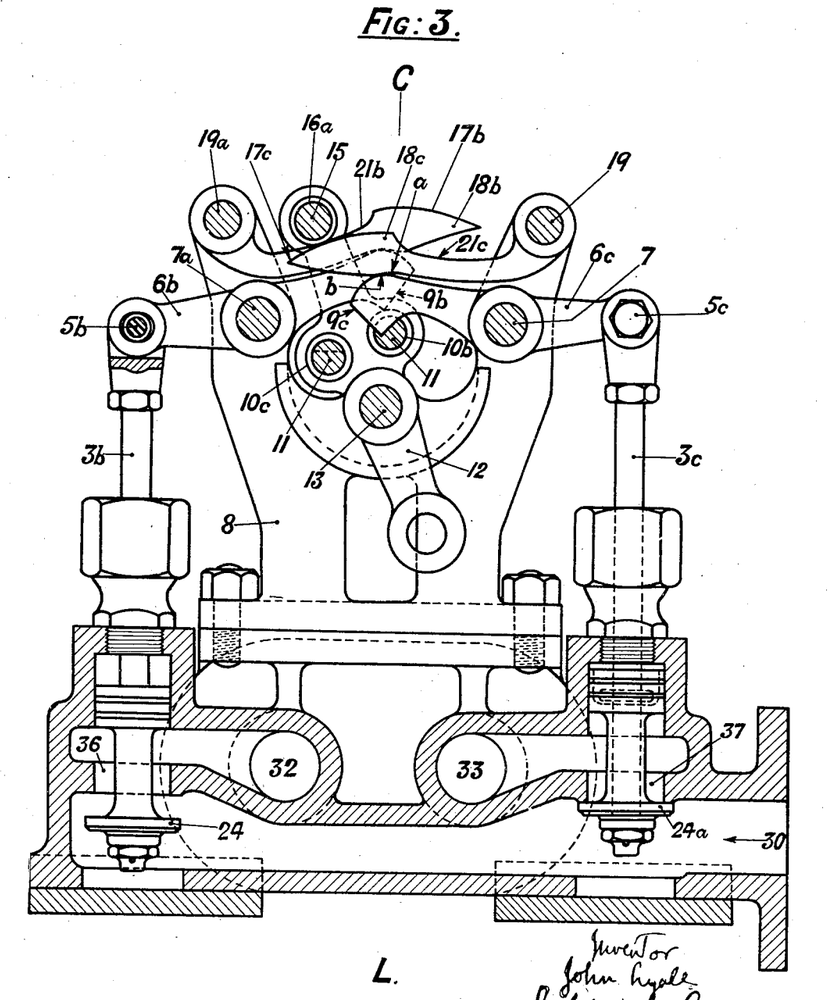
Figs. 3 and 4 are vertical sectional views on the lines 3—3 and 4—4 of Fig. 1, looking in the direction of the arrows, and showing also the valves and valve gear.
Figure 4:
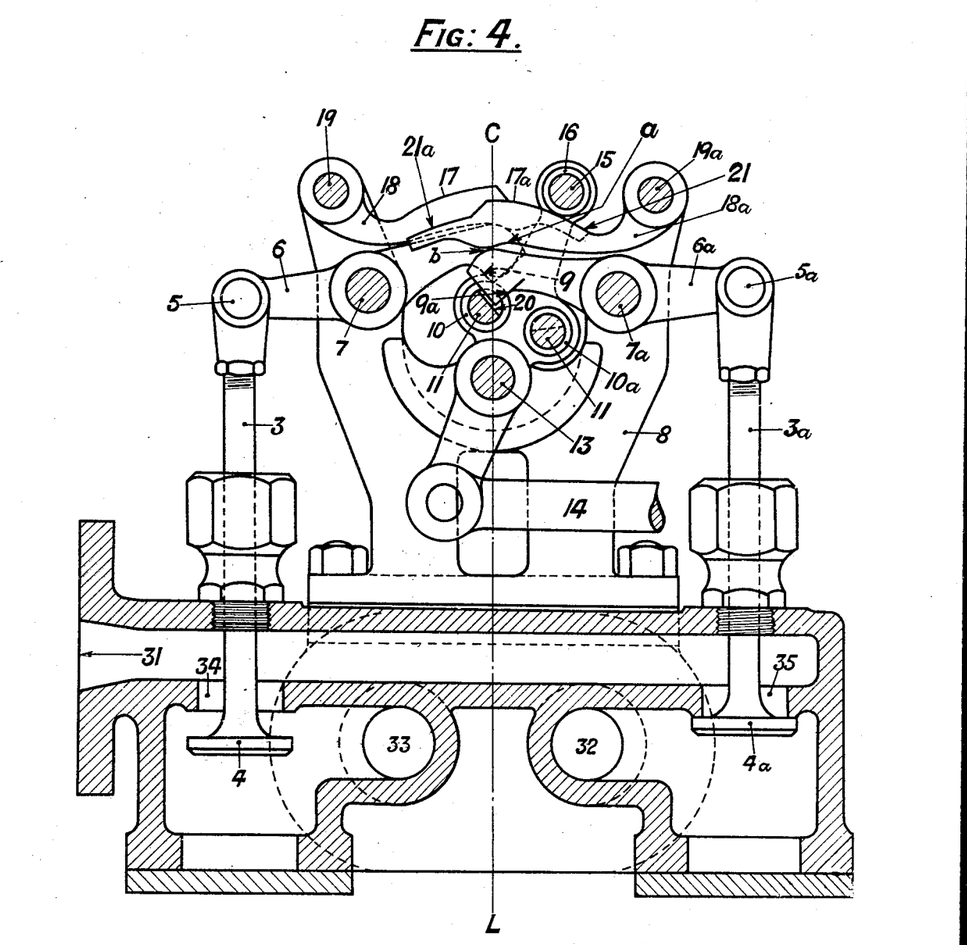
Figure 5:
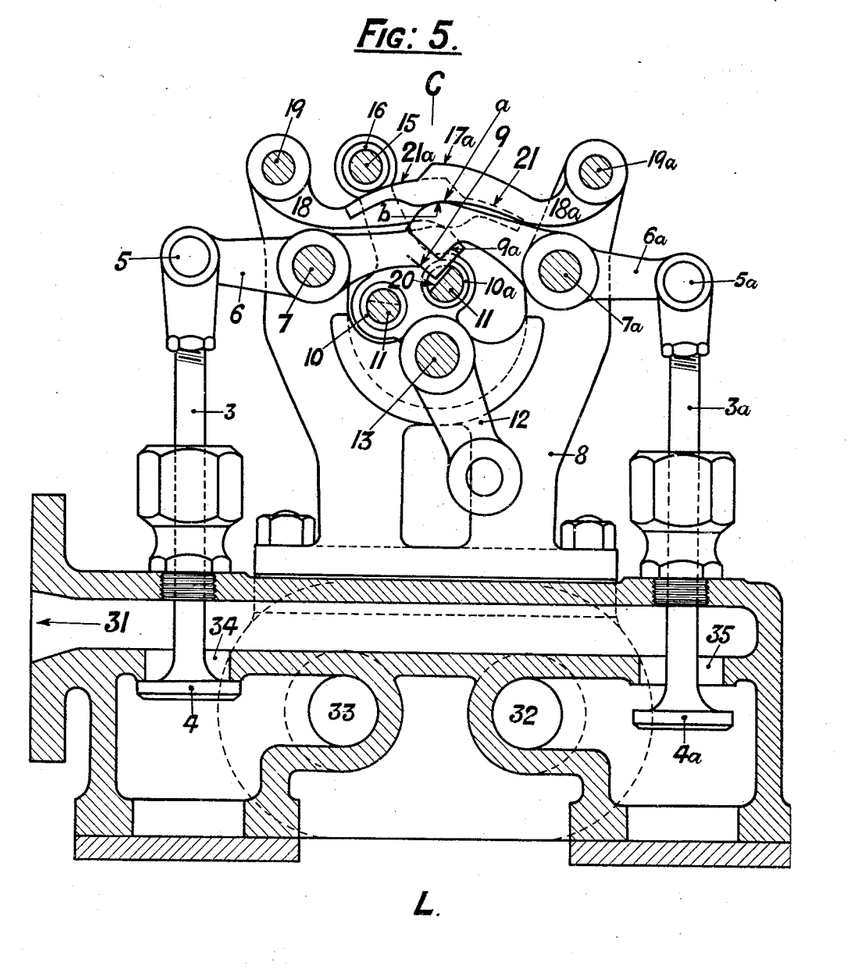
Fig. 5 is a view corresponding to Fig. 4, but showing the position of the valves reversed.
Figure 6:
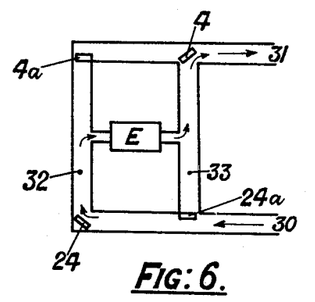
Figs. 6 and 7 are diagrammatic views illustrating the application of my invention to the valve chest of a steam steering engine.

Figs. 3 and 4 show the positions of the two pairs of valve gear when steam is supplied to the steering engines. In the mid-position (not shown) of the valve gear, all the valves are held closed by the rollers 16, $16^a$ engaging the closing-cams 17, $17^a$, $17^b$ and $17^c$.

The valve gear may be operated from the hunting gear by connecting rod 14 attached to the rockers 12.

In Fig. 3, the closing-cam levers $18^b$, $18^c$ differ slightly from the closing-cam levers 18 and $18^a$ of Fig. 4 in that they have their idle contact faces $21^b$ and $21^c$ between the cam faces $17^b$ and $17^c$ and the pivots $19^a$ and $19^b$, whereas in Fig. 4 the idle contact faces 21, $21^a$ form extensions of the cam levers 18 and $18^a$. This difference in design is necessary to obtain the desired actuation of the valves without lost motion.

Each closing-cam lever has a concave face $a$ cooperating with a convex face $b$ on the corresponding levers 6, $6^a$, $6^b$ or $6^c$.

In order to provide clearance for the ends of the levers 6, $6^a$, $6^b$ and $6^c$ in the closed position of the valves, the rods 11 are cutaway or formed with flats 20.

It will be seen that the closing-cam faces 17 and $17^c$ are on the opposite side of the centre line C—L to the closing cam faces $17^a$ and $17^b$.

During actuation of the valves, lost motion or slack may be avoided by forming the closing-cam levers 18, $18^a$, $18^b$ and $18^c$ with contact faces 21, $21^a$, $21^b$ and $21^c$ respectively, which contact with the closing-cam rollers 16 and $16^a$ when the latter are not riding upon the closing-cam faces 17, $17^a$, $17^b$ and $17^c$. It will be apparent from the drawings that the contact faces 21, $21^a$, $21^b$ and $21^c$ and the closing-cams 17, $17^a$, $17^b$ and $17^c$ each has its radius in the centre of the rocking shaft 13.

The operation of the mechanism is as follows:—Assuming that the parts are in the position shown in Figs. 3 and 4 with the valves 4 and 24 open, and that it is desired to reverse the position of the valves, the shaft 13 is rocked, thereby causing rollers $10^a$ and $10^c$ to engage cam faces $9^a$ and $9^c$ and lift levers $6^a$ and $6^c$ of valves $4^a$ and $24^a$. During this movement, rollers 16 and $16^a$ ride off cam faces $17^a$ and $17^c$ on to the contact faces $21^a$ and $21^c$, which in the interval have been lifted by levers $6^a$ and $6^c$. The valves $4^a$ and $24^a$ are thus opened. Simultaneously, rollers 10 and $10^b$ clear cam faces 9 and $9^b$ (see Fig. 5) and rollers 16 and $16^a$ ride up contact faces 21 and $21^b$ on to the closing-cam faces 17 and $17^b$, thereby depressing cam levers 18 and $18^b$ and levers 6 and $6^b$ which close the valves 4 and 24.

In the mid-position (not shown) of the rockers and valve gear, the rollers 16 and 16ª both engage their corresponding cam faces and thus hold both valves in closed position.

For convenience, I have described my improved valve gear as applied to the actuation of two pairs of valves, but it will be understood that any number of valves can be actuated by multiplying the valve gears and disposing the opening and closing cam faces so that the desired actuation of the valves is attained.

Referring now to Figs. 8 to 16 of the drawings which represent the application of my invention to a system or apparatus through which different fluids are to flow, such as the heating and cooling platen of a moulding press, A represents the platen which has a single inlet $a'$ and a single outlet $b'$, each connected with steam and water pipes for supplying and discharging the different fluids. The steam pipes are controlled by steam inlet and outlet valves SI and SO respectively, and the water pipes are controlled by water inlet and outlet valves WI and WO respectively.

It will be apparant that, in order to heat up the platen A, it is necessary to open the steam valves SI and SO and to close the water valves WI and WO and that, when the platen is to be cooled, it is necessary to change over from steam supply to water supply by closing the steam valves SI and SO and opening the water valves WI and WO. When the platen is to be again brought up to steam heat, the positions of the valves are again reversed, but the water remaining in the platen A after the change-over would retard the heating-up of the platen. I provide therefore for the opening of the valve SI in advance of the closing of the valve WO, so that the incoming steam will sweep out the water in the platen A through the water outlet valve WO. This effects efficient scavenging of the platen and enables it to be thereafter rapidly brought up to steam heat on closing the water outlet valve WO.

Figure 9:
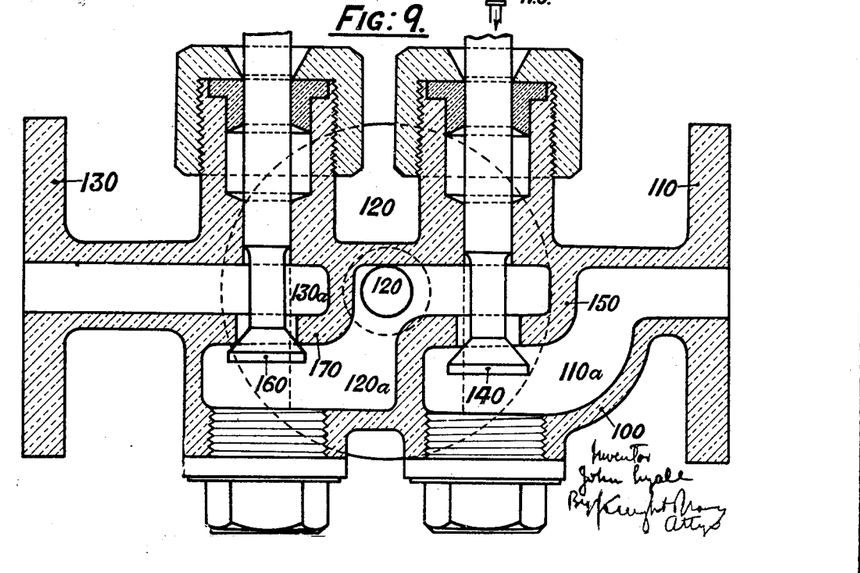
Fig. 9 is a sectional view through a pair of valves designed for the supply of fluid to a platen press.

The four valves are preferably arranged close together with each inlet valve alongside an outlet valve. Two of the valves are shown in Fig. 9 which shows a valve chest or casing 100 having flanged connections 110, 120 and 130 for bolting up to the steam and water pipes. The connection 110 opens into a space 110ª beneath the valve 140 which controls a port in a partition 150 separating the space 110ª from a central space 120ª open to the connection 120. The space 120ª extends to the underside of the other valve 160 which controls a port in a partition 170 which separates the space 120ª from a space 130ª leading to the connection 130.

The valves 140 and 160 move in opposite directions and the central space 120ª is connected up to either the inlet $a'$ or outlet $b'$ of the platen A. When the valve 140 serves as an inlet valve for steam entering at 110, the valve 160 serves as a water outlet valve. At the same time, the valve 140 of the other pair of valves serves as the steam outlet valve and the valve 160 serves as the water inlet valve.

The valves 140 are held open together when the valves 160 are held closed, so that if steam enters through the connection 110 of one valve casing, it passes into the space 120ª and through the connection 120 to the platen, from whence it enters the other valve casing by way of the connection 120 and passes to exhaust through the open valve 140 and connection 110 of the other valve casing. During this time, the valves 160 shut off the water flow.

When changing-over from steam to water flow, the valves 140 are closed and the valves 160 are opened. The water then enters through the connection 130 of one valve chest and escapes through the connection 130 of the other valve chest, passing in its way through the open valves 160 and through the platen by way of the connections 120.

When changing-over from water to steam flow, a dwell period is allowed for sweeping the water out of the platen. This is effected by opening the steam inlet valve SI just before the water outlet valve WO closes. This position of the valve is shown in Fig. 10.

Figure 16:
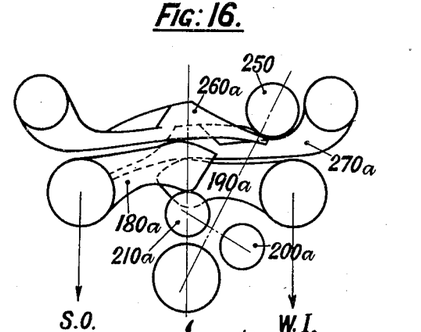

The operation of the valves will now be more clearly understood by reference to Figs. 10 and 16 of the drawings.

Referring to Fig. 10 of the drawings, the valve spindles are connected to rockers 180 and 190 which have cam faces 180ª and 190ª cooperating with rollers 200 and 210 respectively carried on rods which extend between a pair of end plates 220 pivoted at 230 to a fixed bracket 240. The end plates 220 also support a rod which carries rollers 250 for engaging with cam levers 260 and 270 which press upon the rockers 180 and 190. The levers 260 and 270 are pivoted on rods 280 between fixed brackets 290 and the rockers 180 and 190 are pivoted on similar rods 300. The end plates 220 carrying the rollers 200, 210 and 250 are rocked about the pivot 230 by a single hand lever 310.

Figures 11, 12:
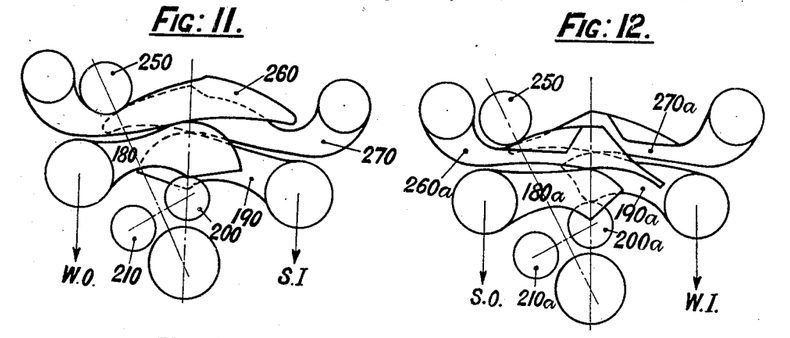
Figs. 11 and 12 show the positions of the two sets of valve gear for the platen press with the water supply open and the steam supply cut off.

Side by side with the valve gear just described is a similar valve gear for controlling the other two valves, except that the rockers and cam levers are of different design, as seen in Fig. 12. All the four cam levers are controlled by the operation of one hand lever 310.

The operation of the valves will be more clearly understood by reference to Figs. 11 to 16 of the drawings. Figs. 11 and 12 show the hand lever in one extreme position. The roller 250 has depressed the cam lever 270 and rocker 190, but the roller 200 has raised the rocker 180 and cam lever 260. Rocker 180 is connected to the water outlet valve WO and rocker 190 to steam inlet valve SI, so that in Fig. 11 the water outlet valve is open and the steam inlet valve is closed. Fig. 12 shows the position of the other valve gear at that moment. The roller 250 has depressed cam lever 260$^a$ and rocker 180$^a$, but roller 200$^a$ has raised rocker 190$^a$ and cam lever 270$^a$. Rocker 180$^a$ is connected to steam outlet valve SO and rocker 190$^a$ to water inlet valve WI, so that in this position, water is admitted to the platen and the steam supply is cut-off.

Figure 13:
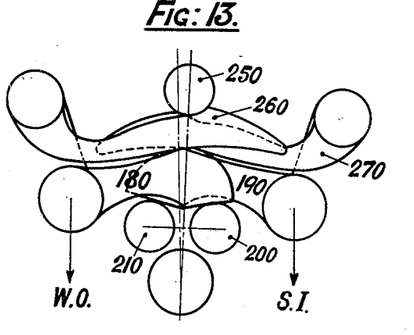
Figs. 13 and 14 show the two sets of valve gear in the dwell position corresponding to Fig. 10.
Figure 14:
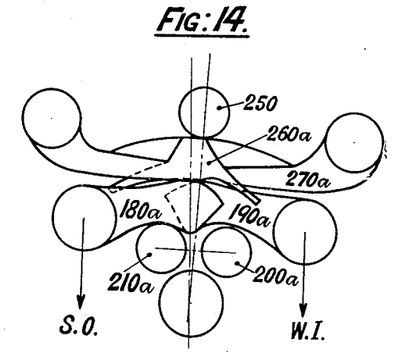
Figure 15:
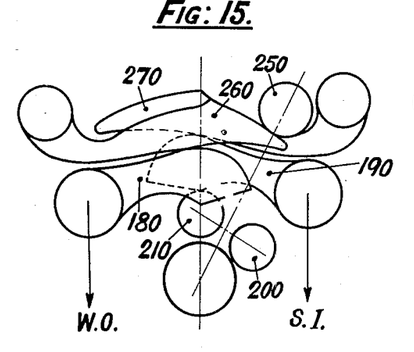
Figs. 15 and 16 show the two sets of valve gear when the steam valves are open and the water valves are closed.

To change-over from water to steam, the hand lever 310 is moved to the position shown in Figs. 10, 13 and 14. Fig. 13 corresponds to Fig. 10. In this position, the roller 250 has commenced to ride down the cam lever 270 and up the cam lever 260 and the rollers 200 and 210 have brought the rockers 180 and 190 into such a position that the water outlet valve WO has partly closed and the steam inlet valve SI has partly opened. At the same time, as seen in Fig. 14, the rollers 200$^a$, 210$^a$ and 250 hold the rockers 180$^a$ and 190$^a$ and cam levers 260$^a$ and 270$^a$ in such a position that the valve WI has closed and the steam valve SO is about to open. Thus it will be seen that the steam inlet valve has opened slightly in advance of the closing of the water outlet valve.

The hand lever 310 may be left in the position shown in Figs. 10, 13 and 14 for any desired length of time according to the scavenging effect desired.

When moved over to the other extreme position (Figs. 15 and 16), the hand lever 310 has caused the rollers 200, 210 and 250 to close the water outlet and fully open the steam inlet, at the same time holding the water-inlet valve closed and the steam outlet open.

By this means, the heating up of the platen of the press can be very rapidly effected, because the advance opening of the steam inlet will cause the steam to effectively scavenge the platen of any cold water and eject it through the open water outlet valve, whereupon the closing of the water outlet will enable the steam to rapidly bring the platen up to steam heat.

In order to simplify the change-over from one fluid to another, the valve gear is so designed that it can be controlled by a single pivoted lever, and in order that the attendant may vary the duration of the scavenging period according to requirements, the valve gear is constructed to provide a dwell position for the valve operating lever intermediate its two extreme positions.

Claims:

1. Control valve mechanism for actuating a plurality of valves, one or more of which require to be opened, whilst the remaining valve or valves remain closed, and wherein the positions of the valves require to be frequently reversed, comprising an operating lever connected to each valve, a series of closing-cam levers, each cooperating with one of the levers, a cam on each lever, an opposite cam on the corresponding closing-cam lever, and a rocker carrying rollers for cooperating with said cams.

2. Control valve mechanism comprising a pair of oppositely-directed rockers, each connected at one end to a valve spindle and having a cam face at its other end, the two cam faces being oppositely inclined to each other, a pair of oppositely-directed levers bearing upon said rockers, a central control shaft, crank arms on said shaft, rollers supported between said crank arms for cooperating with the cam faces on said rockers, cam faces on said levers, said cam faces being each formed by two curves of different radius from the centre of said control shaft, and rollers supported between said crank arms for cooperating with the cam faces on said levers.

3. A plurality of control valve mechanisms as claimed in claim 2 arranged side by side and actuated by a single control member operating the control shaft.

4. Control valve mechanism as specified in claim 2 in which each rocker has an upper convex face cooperating with a concave face on the underside of the lever which bears upon it.

5. Control valve mechanism as specified in claim 2 having flats on rods carrying the rocker-actuating rollers, said flats forming abutments for the ends of the rockers.

6. Control valve mechanism as specified in claim 2 in which the cam faces of greater radius upon the levers overlap the centre line of the mechanism to provide a dwell position for their cooperating rollers, in which position the valves are held closed.

The foregoing specification signed at Edinburgh, Scotland, this 31st day of March, 1926.

JOHN LYALL.

CERTIFICATE OF CORRECTION.

Patent No. 1,675,982.                          Granted July 3, 1928, to

JOHN LYALL.

It is hereby certified that error appears in the printed specification of the above numbered patent requiring correction as follows: Page 4, line 72, claim 1, before the word "levers" and before "lever" insert the word "operating"; and that the said Letters Patent should be read with this correction therein that the same may conform to the record of the case in the Patent Office.

Signed and sealed this 7th day of August, A. D. 1928.

(Seal)
                                               M. J. Moore,
Acting Commissioner of Patents.